(12) United States Patent
Hori

(10) Patent No.: US 11,379,045 B2
(45) Date of Patent: Jul. 5, 2022

(54) VIBRATION ACTUATOR AND METHOD FOR DRIVING VIBRATION ACTUATOR

(71) Applicant: NIDEC COPAL CORPORATION, Tokyo (JP)

(72) Inventor: Hiroyuki Hori, Tokyo (JP)

(73) Assignee: NIDEC COPAL CORPORATION, Tokyo (JP)

(*) Notice: Subject to any disclaimer, the term of this patent is extended or adjusted under 35 U.S.C. 154(b) by 0 days.

(21) Appl. No.: 17/213,223

(22) Filed: Mar. 26, 2021

(65) Prior Publication Data

US 2021/0303073 A1  Sep. 30, 2021

(30) Foreign Application Priority Data

Mar. 27, 2020  (JP) .............................. JP2020-057245

(51) Int. Cl.
    *G06F 3/01*    (2006.01)
    *G06F 3/041*    (2006.01)
    *B06B 1/02*    (2006.01)
    *B06B 1/04*    (2006.01)

(52) U.S. Cl.
    CPC ............ *G06F 3/016* (2013.01); *B06B 1/0223* (2013.01); *B06B 1/04* (2013.01); *G06F 3/0412* (2013.01); *G06F 3/0416* (2013.01)

(58) Field of Classification Search
None
See application file for complete search history.

(56) References Cited

U.S. PATENT DOCUMENTS

2018/0182212 A1* 6/2018 Li ............................ G06F 3/01
2020/0218104 A1* 7/2020 Togashi .............. G02F 1/13338

FOREIGN PATENT DOCUMENTS

JP      2019785 A     1/2019

* cited by examiner

*Primary Examiner* — Stephen T. Reed
(74) *Attorney, Agent, or Firm* — Hauptman Ham, LLP

(57) ABSTRACT

A vibration actuator and a method for driving the vibration actuator can improve the user's tactile sensation. A plurality of tactile devices are attachable at different positions on a surface of a touch panel to vibrate the touch panel. A driver drives, in response to a touch detection signal representing a touch position from the touch panel, the plurality of tactile devices each using a driving signal having a predetermined driving frequency. Of the plurality of tactile devices, a tactile device closest to the touch position is operable as a master device, and a tactile device other than the master device is operable as a slave device. The master device and the slave device are driven using the driving signal having the driving frequency being a resonant frequency of the master device.

13 Claims, 7 Drawing Sheets

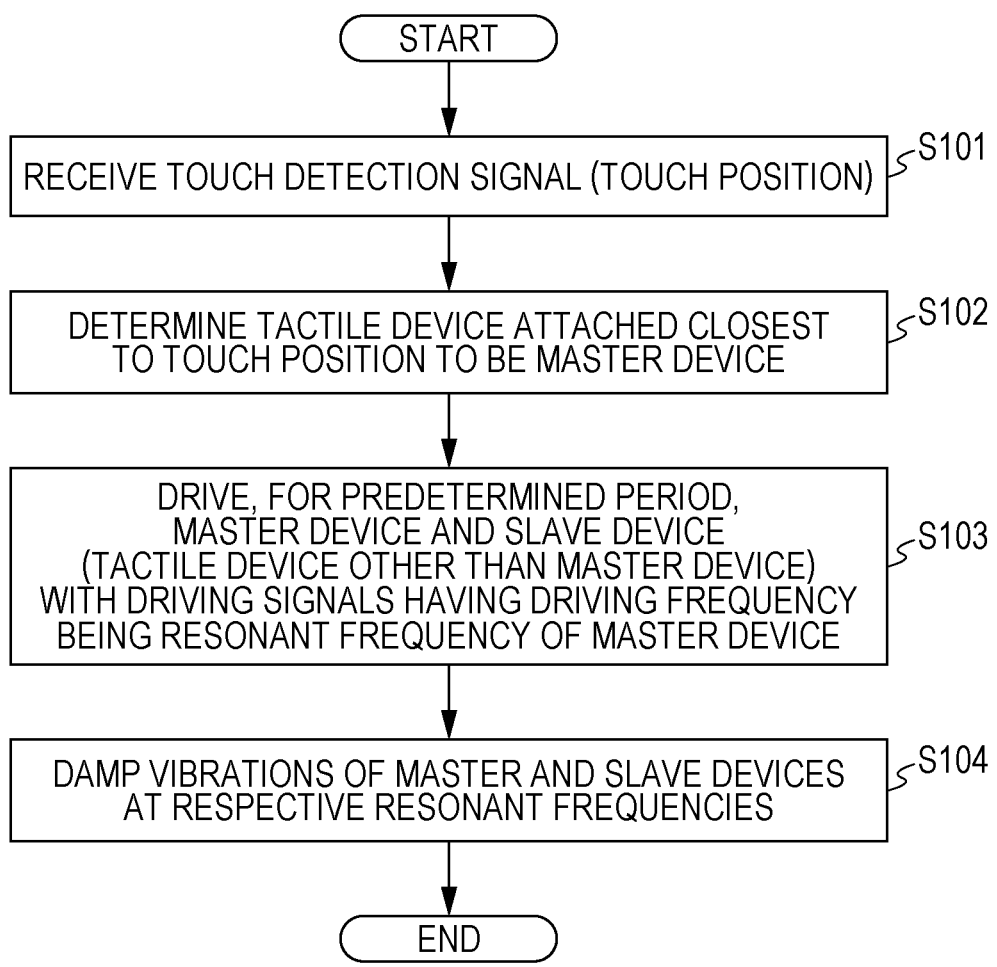

VIBRATION ACTUATOR AND METHOD FOR DRIVING VIBRATION ACTUATOR

RELATED APPLICATIONS

The present application claims priority to Japanese Application Number 2020-057245, filed Mar. 27, 2020, the disclosure of which is hereby incorporated by reference herein in its entirety.

BACKGROUND

Technical Field

The present invention relates to a vibration actuator and a method for driving the vibration actuator.

Description of the Background

Patent Literature 1 describes a vibration actuator including multiple vibrators with different resonant frequencies. A method described in Patent Literature 1 allows the vibration actuator to vibrate at different frequencies and large amplitudes, and allows an operator to receive feedback of different vibrations in response to, for example, different operational inputs.

CITATION LIST

Patent Literature

Patent Literature 1: Japanese Unexamined Patent Application Publication No. 2019-785

BRIEF SUMMARY

Touch panels are common in various fields, including home appliances, mobile devices (e.g., smartphones and tablets), and in-vehicle equipment. However, touch panels provide a less tactile sensation, unlike operation with known mechanical buttons. Thus, touch panels incorporating tactile devices have recently gained popularity. In response to a user's touch on a touch panel, a tactile device vibrates the touch panel, providing the user with an appropriate tactile sensation (tactile feedback).

A larger touch panel may incorporate multiple tactile devices to provide sufficient vibrations. However, the tactile devices may be linear resonant actuators that have, for example, variations of about several percent in resonant frequency caused by manufacturing variations, environmental factors (e.g., temperature), and changes over time. Different tactile devices may thus have different optimum driving frequencies. Such tactile devices vibrating individually at their optimum frequencies may produce largely disturbed vibrations on the touch panel, possibly reducing the user's tactile sensation.

In response to the above issue, one or more aspects of the present invention are directed to a vibration actuator and a method for driving the vibration actuator that can improve the user's tactile sensation.

A vibration actuator according to an aspect of the present invention is a vibration actuator for a touch panel. The vibration actuator includes a plurality of tactile devices and a driver. The plurality of tactile devices are attachable at different positions on a surface of the touch panel to vibrate the touch panel. The driver drives, in response to a touch detection signal representing a touch position from the touch panel, the plurality of tactile devices each using a driving signal having a predetermined driving frequency. Of the plurality of tactile devices, a tactile device closest to the touch position is operable as a master device, and a tactile device other than the master device is operable as a slave device. The master device and the slave device are driven using the driving signal having the driving frequency being a resonant frequency of the master device.

In an aspect of the present invention, the plurality of tactile devices vibrate in the same direction along the surface of the touch panel.

In another aspect of the present invention, the driver includes a resonant frequency detector that detects the resonant frequency of the master device. The master device is driven using a master driving signal generated through closed-loop control using the resonant frequency of the master device detected by the resonant frequency detector as a target driving frequency. The slave device is driven through open-loop control using a slave driving signal generated based on the resonant frequency of the master device.

In still another aspect of the present invention, after the master device is driven using the driving signal, vibrations of the master device are damped using a master damping signal, and the master damping signal is opposite in polarity to the driving signal and varies at the resonant frequency of the master device. After the slave device is driven using the driving signal, vibrations of the slave device are damped using a slave damping signal, and the slave damping signal is opposite in polarity to the driving signal and varies at a resonant frequency of the slave device.

In still another aspect of the present invention, the plurality of tactile devices are evenly spaced from one another on the surface of the touch panel.

A method according to an aspect of the present invention is a method for driving a vibration actuator for a touch panel. The vibration actuator includes a plurality of tactile devices attachable at different positions on a surface of the touch panel to vibrate the touch panel. The method includes determining, of the plurality of tactile devices, a tactile device closest to a touch position to be a master device in response to a touch detection signal representing the touch position from the touch panel, and driving, using a driving signal having a driving frequency being a resonant frequency of the master device, the master device and a slave device being a tactile device other than the master device of the plurality of tactile devices.

In an aspect of the present invention, the plurality of tactile devices vibrate in the same direction along the surface of the touch panel.

In another aspect of the present invention, driving the master device and the slave device includes driving the master device using a master driving signal generated through closed-loop control using the resonant frequency of the master device as a target driving frequency, and driving the slave device through open-loop control using a slave driving signal generated based on the resonant frequency of the master device.

In still another aspect of the present invention, the method further includes, after driving the master device and the slave device, damping vibrations of the master device using a master damping signal and damping vibrations of the slave device using a slave damping signal. The master damping signal is opposite in polarity to the driving signal and varies at the resonant frequency of the master device. The slave damping signal is opposite in polarity to the driving signal and varies at a resonant frequency of the slave device.

The vibration actuator and the method for driving the vibration actuator according to the above aspects of the present invention can improve the user's tactile sensation.

BRIEF DESCRIPTION OF DRAWINGS

FIG. 2 is a flowchart illustrating an example method for driving the vibration actuator in FIG. 1.

DETAILED DESCRIPTION

Figure 1:
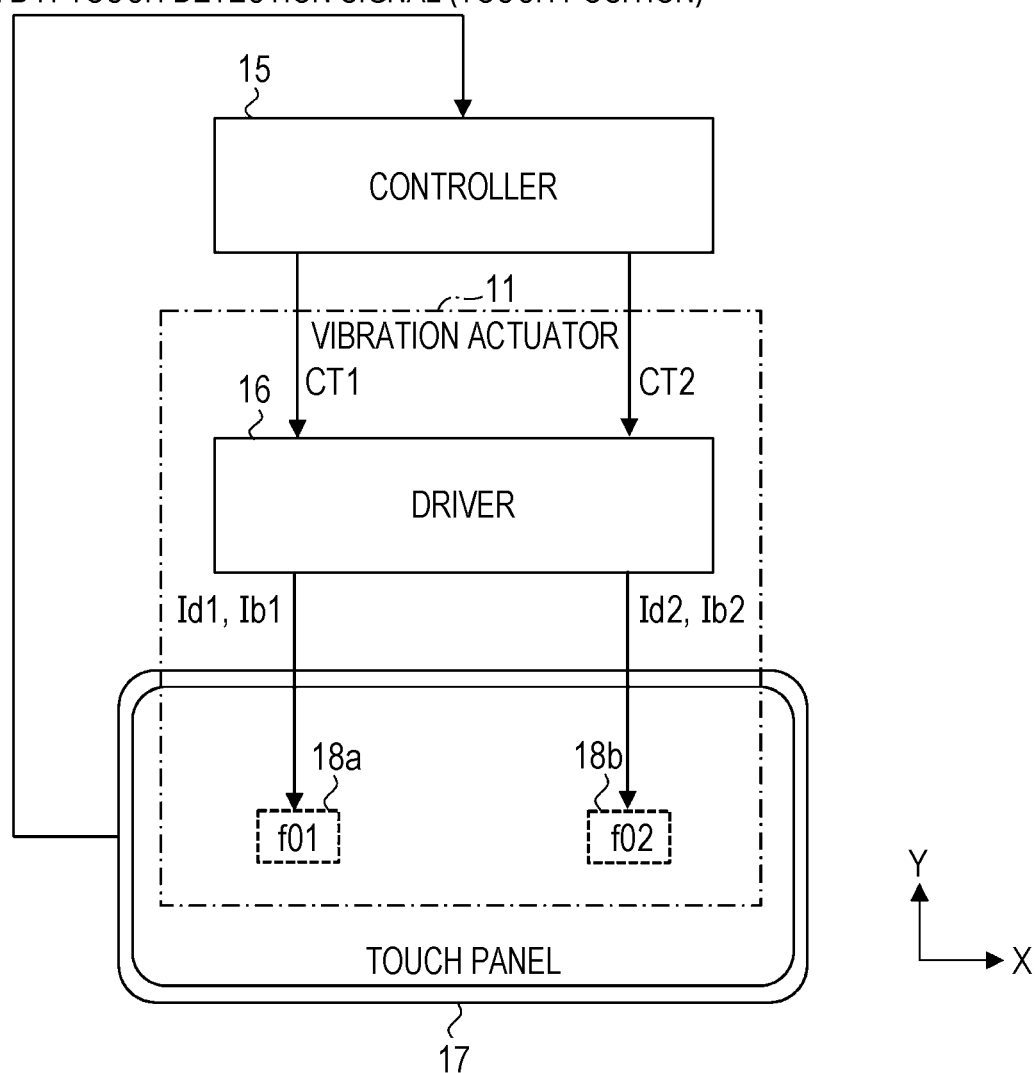
FIG. 1 is a schematic diagram of an example touch panel system including a vibration actuator according to an embodiment of the present invention.

Embodiments of the present invention will now be described in detail with reference to the drawings. Throughout the drawings describing the embodiments, the same components are basically given the same reference numerals and will not be described repeatedly.

Overview of Touch Panel System

FIG. 1 is a schematic diagram of an example touch panel system including a vibration actuator according to an embodiment of the present invention. A touch panel system 10 shown in FIG. 1 includes a vibration actuator 11, a controller 15, and a touch panel 17. The vibration actuator 11 is used for the touch panel 17. The vibration actuator 11 includes multiple (two in this example) tactile devices 18a and 18b and a driver 16. The multiple tactile devices herein are collectively referred to as tactile devices 18.

The tactile devices 18a and 18b are attached at different positions on the surface of the touch panel 17. One direction along the surface of the touch panel 17 is herein defined as an X-direction, and a direction orthogonal to the X-direction is herein a Y-direction. The tactile devices 18a and 18b are evenly spaced from each other on the surface of the touch panel 17. In this example, the tactile devices 18a and 18b are aligned with each other at a predetermined distance in the X-direction on the undersurface of the touch panel 17.

The driver 16 drives the tactile devices 18a and 18b using driving signals (e.g., driving currents Id1 and Id2) having predetermined driving frequencies in response to a touch detection signal TDT representing a touch position from the touch panel 17. More specifically, the controller 15 receives the touch detection signal TDT and outputs control signals CT1 and CT2 to the driver 16. The driver 16 receives the control signals CT1 and CT2 output in response to the touch detection signal TDT, and uses these signals CT1 and CT2 to drive the tactile devices 18a and 18b.

For example, in-vehicle equipment may incorporate a large, heavy touch panel 17, which is to be vibrated while the vehicle is vibrating. To allow the vibration actuator 11 to transmit sufficient vibrations to touch positions on the touch panel 17, such multiple tactile devices 18a and 18b may be attached to the touch panel 17 as shown in FIG. 1.

However, the tactile devices 18a and 18b may have variations in resonant frequency caused by various factors described above. In the example in FIG. 1, the tactile device 18a has a resonant frequency f01, and the tactile device 18b has a resonant frequency f02 ($\neq$f01). In this case, the tactile devices 18a and 18b driven on the respective driving currents Id1 and Id2 at the resonant frequencies f01 and f02 may produce largely disturbed vibrations on the touch panel 17. More specifically, for example, vibrations with different frequencies and thus with different phases may cancel each other on the touch panel 17. This may reduce the vibration level of the touch panel 17, possibly reducing the user's tactile sensation.

Thus, the controller 15 receiving the touch detection signal TDT determines the tactile device (18a or 18b) attached closest to a touch position to be a master device. The controller 15 thus uses the tactile device (e.g., 18b) other than the master device (e.g., 18a) as a slave device. The controller 15 outputs the control signals CT1 and CT2 to drive the master device (18a) and the slave device (18b) at the resonant frequency (f01) of the master device (18a). This causes the master device (18a) and the slave device (18b) to be driven by the driver 16 using the driving signals (Id1 and Id2) both having the driving frequency being the resonant frequency (f01) of the master device (18a). The tactile devices 18a and 18b thus vibrate in phase, and are prevented from producing vibrations that cancel each other as described above.

The slave device (18b) is driven at the driving frequency (f01) different from its resonant frequency (f02) and may thus have a slightly lower amplitude. However, the slave device (18b) having the lower amplitude causes vibration level reduction in the touch panel 17 far less than vibration level reduction caused by the phase difference. The touch panel 17 can have a sufficient vibration level, improving the user's tactile sensation.

The controller 15 in FIG. 1 is typically implemented with, for example, a central processing unit (CPU) executing a program stored in a random-access memory (RAM). In some embodiments, however, the controller 15 may be implemented with, for example, a field-programmable gate array (FPGA) or an application-specific integrated circuit (ASIC). The driver 16 is implemented with, for example, a driver integrated circuit (IC).

Figure 3A:
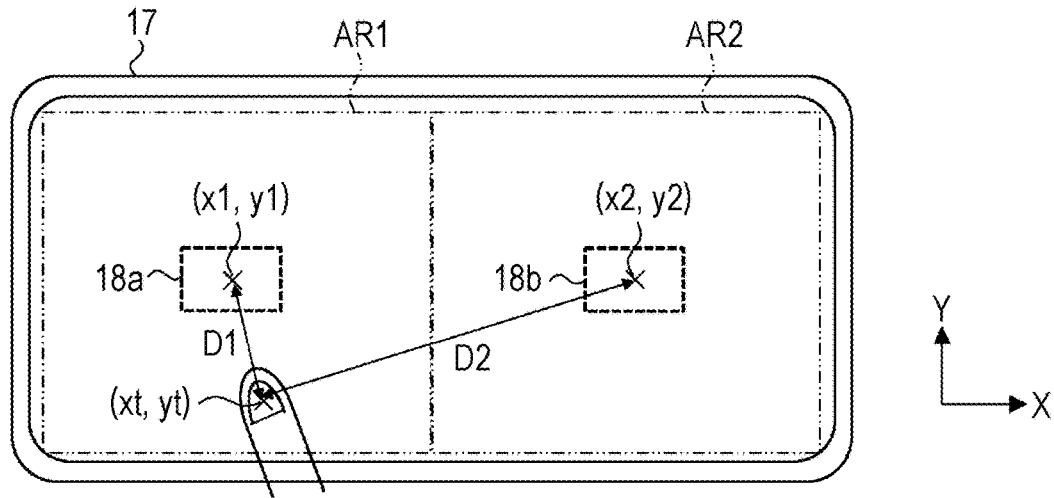
FIG. 3A is a diagram describing different example methods for determining a master device in FIG. 2.
Figure 3B:
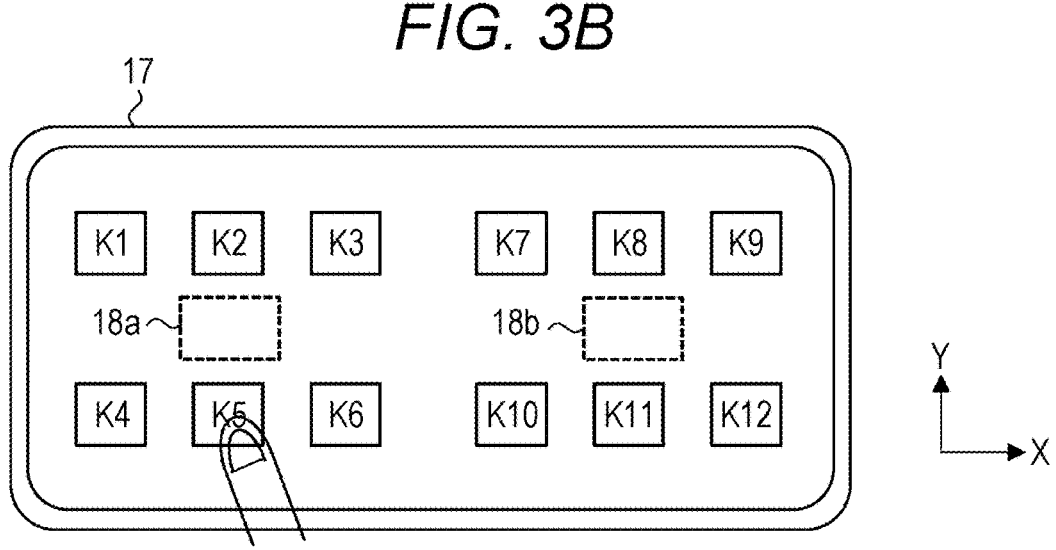
FIG. 3B is a diagram describing an example method of determination other than the methods shown in FIG. 3A.

FIG. 2 is a flowchart illustrating an example method for driving the vibration actuator in FIG. 1. FIGS. 3A and 3B are diagrams describing different example methods for determining a master device in FIG. 2. In FIG. 2, the controller 15 first receives a touch detection signal TDT representing a touch position from the touch panel 17 (step S101). The controller 15 then determines one tactile device 18 attached closest to the touch position to be a master device (step S102).

With the method 1 in FIG. 3A, for example, the controller 15 receives the coordinates (xt, yt) of the touch position as the touch detection signal TDT. The controller 15 prestores the coordinates (x1, y1) of the attachment position of the tactile device 18a and the coordinates (x2, y2) of the attachment position of the tactile device 18b. The controller 15 uses these coordinates to calculate the distances D1 and D2 between the touch position and the attachment positions of the tactile devices 18a and 18b, and then determines a master device.

With the method 2 in FIG. 3A, the controller 15 prestores a coordinate range AR1 on the touch panel 17 for determining the tactile device 18a to be a master device, and a coordinate range AR2 on the touch panel 17 for determining the tactile device 18b to be a master device. The controller 15 determines a master device based on the received coordinates (xt, yt) of the touch position and the coordinate ranges AR1 and AR2.

With the method 3 in FIG. 3B, the controller 15 receives, as the touch detection signal TDT, a key identification signal representing a touched key among multiple operation keys (virtual keys) K1 to K12 on the touch panel 17. The controller 15 prestores group information about operation keys (K1 to K6) for determining the tactile device 18a to be a master device, and group information about operation keys (K7 to K12) for determining the tactile device 18b to be a master device. The controller 15 determines a master device based on the received key identification signal and the group information.

Referring back to FIG. 2, following step S102, the controller 15 outputs the control signals CT1 and CT2 for driving the master device and also the slave device, which is the tactile device 18 other than the master device, both at the resonant frequency of the master device. The driver 16 then drives, for a predetermined period, the master device (e.g., 18a) and the slave device (18b) using driving signals (Id1 and Id2) having the driving frequency being the resonant frequency (f01) of the master device (step S103).

After the predetermined period, in step S104, the controller 15 outputs the control signal CT1 for damping vibrations of the master device (18a) using a master damping signal (e.g., a damping current Ib1). The master damping signal (Ib1) is opposite in polarity to the driving signal (Id1) in step S103 and varies at the resonant frequency (f01) of the master device (18a). The driver 16 damps vibrations of the master device (18a) by driving the master device (18a) using the master damping signal (Ib1) in response to the control signal CT1 for damping.

In step S104, the controller 15 also outputs the control signal CT2 for damping vibrations of the slave device (18b) using a slave damping signal (e.g., damping current Ib2). The slave damping signal (Ib2) is opposite in polarity to the driving signal (Id2) in step S103 and varies at the resonant frequency (f02) of the slave device (18b). The driver 16 damps vibrations of the slave device (18b) by driving the slave device (18b) using the slave damping signal (Ib2) in response to the control signal CT2 for damping.

Once the tactile devices 18a and 18b stop being driven in step S103, the tactile devices 18a and 18b continue to vibrate at their resonant frequencies while their vibrations are being attenuated. Such residual vibrations can affect the user's tactile sensation and thus are to be eliminated. The processing in step S104 is thus performed. The vibrations of the tactile devices 18a and 18b can be damped using damping signals at their respective resonant frequencies f01 and f02 to effectively eliminate such residual vibrations.

Structure of Tactile Device

Figure 4A:
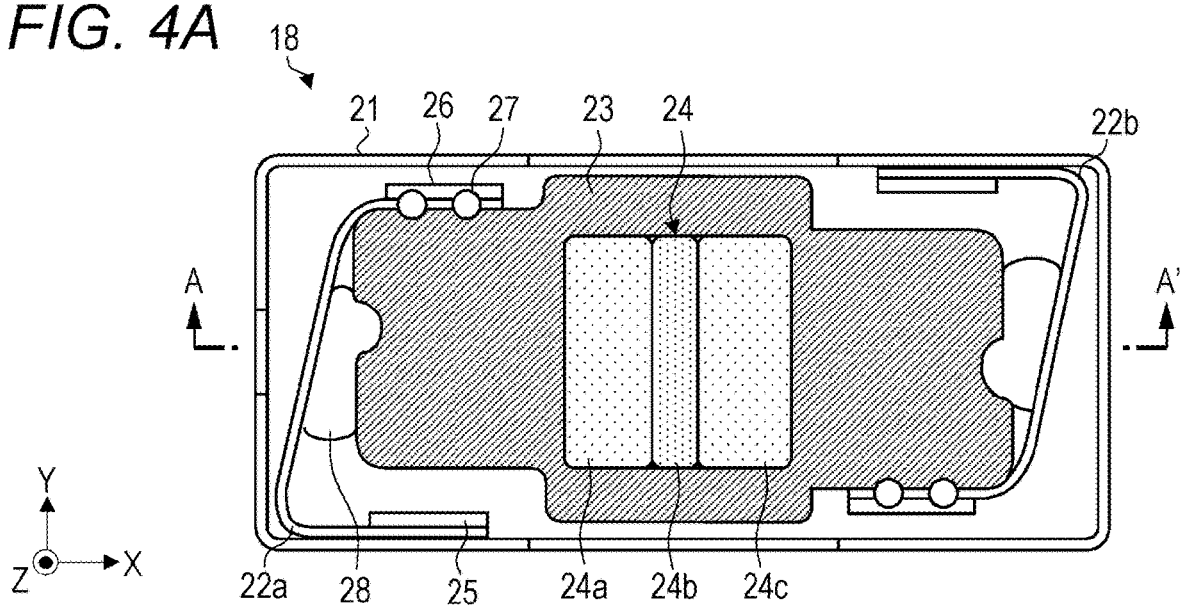
FIG. 4A is a plan view of a tactile device in FIG. 1 showing its example structure.
Figure 4B:
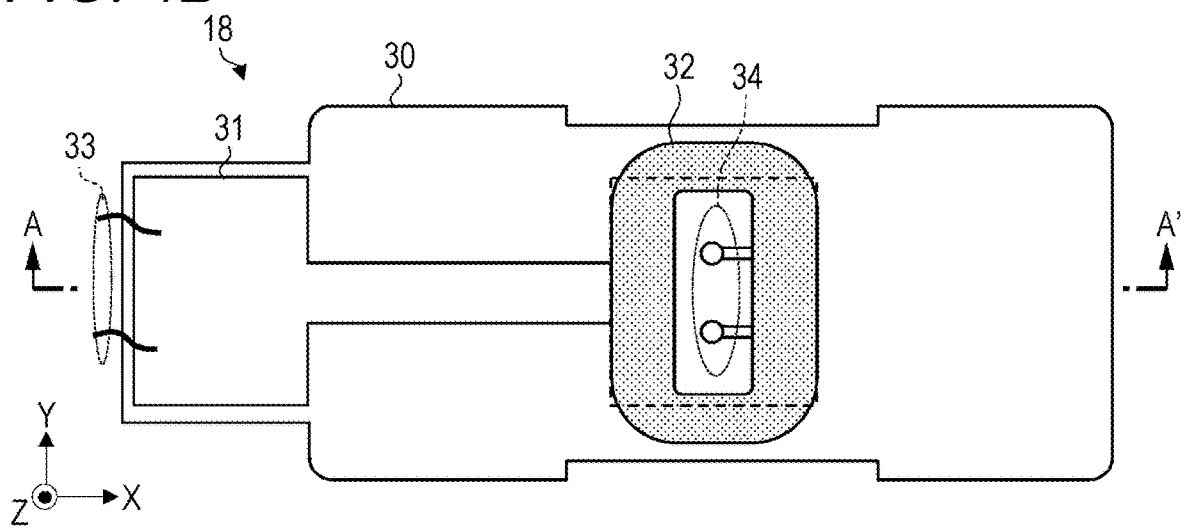
FIG. 4B is a plan view of the tactile device in FIG. 1 showing its example structure.
Figure 4C:
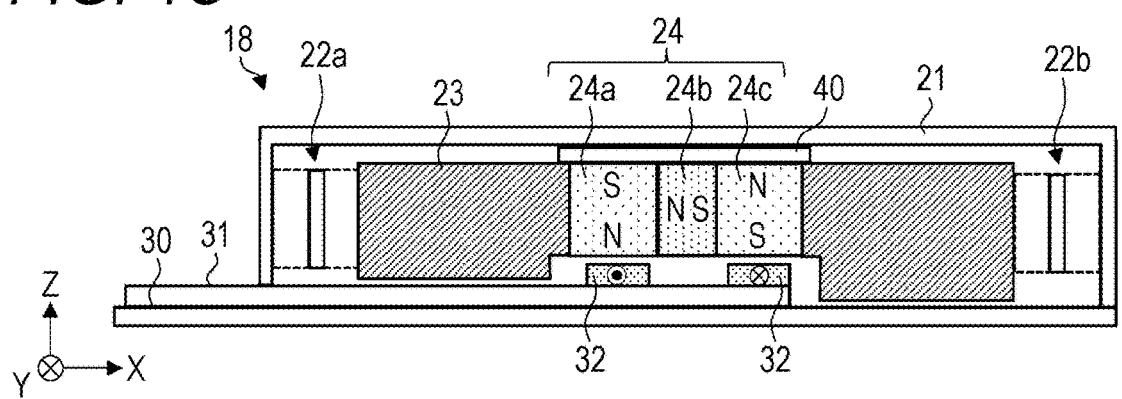
FIG. 4C is a cross-sectional view taken along line A-A' in FIGS. 4A and 4B showing its example structure.

FIGS. 4A and 4B are plan views of the tactile device in FIG. 1 showing its example structure. FIG. 4C is a cross-sectional view taken along line A-A' in FIGS. 4A and 4B showing its example structure. The direction orthogonal to the X- and Y-directions is herein defined as a Z-direction. The X- or Y-direction is herein defined as a lateral direction (right-left direction), and the Z-direction as a vertical (up-down) direction. As shown in FIG. 4C, the components shown in FIG. 4A (specifically being upside down) are located on the components shown in FIG. 4B in the vertical direction.

In FIGS. 4A and 4B, the tactile device 18 includes a base 30, a cover 21, a substrate 31, a coil 32, a weight 23 with a magnet 24, a shock absorber 28, elastic members (leaf springs) 22a and 22b, and reinforcing plates 25 and 26. The substrate 31 is located on the base 30. The coil 32 is located on the substrate 31. The substrate 31 is connected to two leads 33. The leads 33 receive a driving signal (e.g., Id1) from the driver 16 in FIG. 1. The driving signal is transmitted with an interconnection on the substrate 31 to a coil driving terminal 34 extending from the coil 32.

The weight 23 and the magnet 24 together form a vibrator. The weight 23 has a vertical through-hole. The magnet 24 is accommodated in the through-hole and placed on the coil 32 (refer to FIG. 4C). The weight 23 is adjacent to the elastic member 22a on the left. The elastic member 22a is fixed to the weight 23 with the reinforcing plate 26 and a weld 27, and further to the cover 21 with the reinforcing plate 25. The shock absorber 28 is between the weight 23 and the elastic member 22a. The weight 23 is also adjacent to the elastic member 22b on the right. A portion around the elastic member 22b is similar to a portion around the elastic member 22a.

In FIG. 4C, a top plate 40 is between the magnet 24 and the cover 21. The magnet 24 includes odd-numbered (three in this example) magnet pieces 24a, 24b, and 24c having different magnetic poles. In other words, the magnet 24 has a Halbach array. The Halbach array can increase the magnetic field intensity to have higher responsiveness to vibrations of the vibrator (23 and 24).

In FIG. 4C, the coil 32 in FIG. 4B receives a driving current applied clockwise or counterclockwise. The coil 32 then generates a magnetic field in a direction selectively determined by the direction of the applied driving current. The vibrator (23 and 24) reciprocates in the X-direction (lateral direction) in accordance with the magnetic field. This tactile device 18 is called a linear resonant actuator (LRA). The tactile device 18 in FIG. 4C is a horizontal-vibration LRA. The tactile devices 18a and 18b in FIG. 1 may be horizontal-vibration LRAs to vibrate in the same direction (e.g., the X-direction) along the surface of the touch panel 17.

Figure 5A:
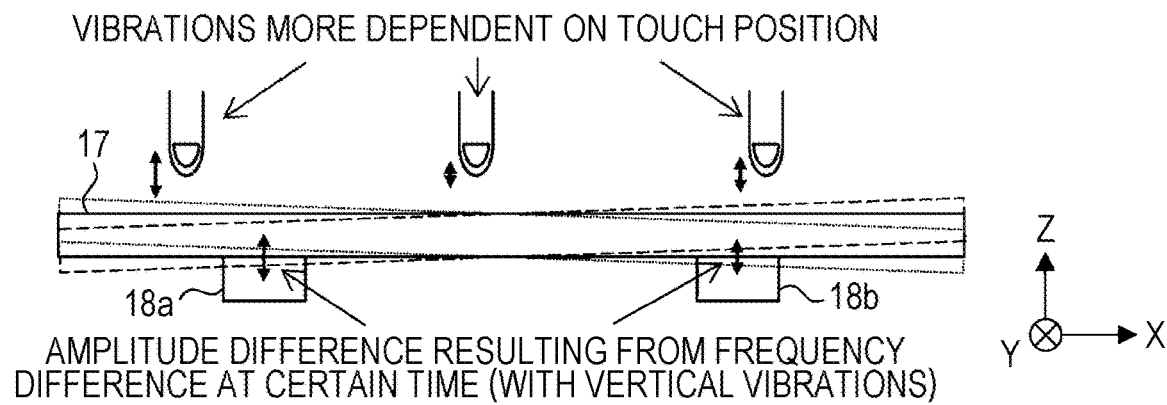
FIG. 5A is a schematic diagram of vertical-vibration linear resonant actuators (LRAs) that are vibrating.
Figure 5B:
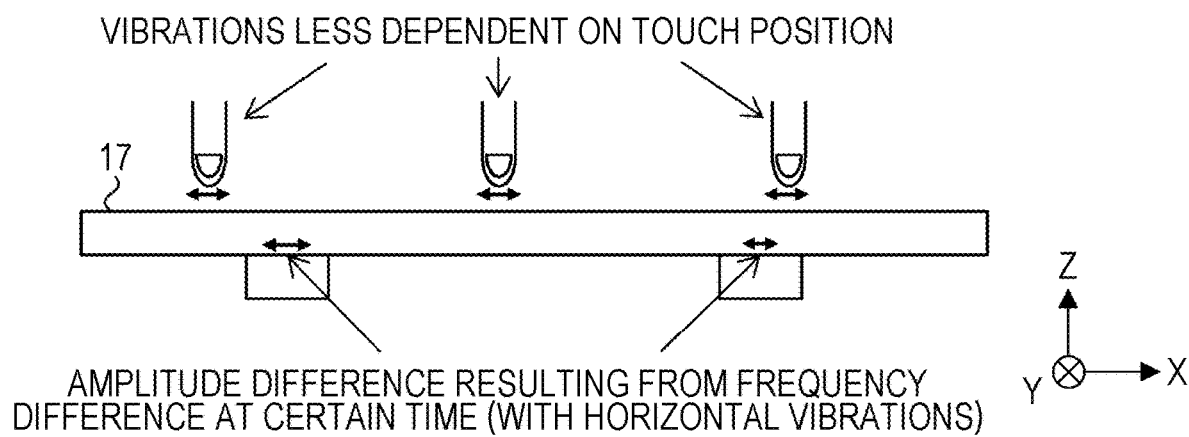
FIG. 5B is a schematic diagram of horizontal-vibration LRAs that are vibrating.

Known LRAs include horizontal- and vertical-vibration LRAs. FIG. 5A is a schematic diagram of vertical-vibration LRAs that are vibrating. FIG. 5B is a schematic diagram of horizontal-vibration LRAs that are vibrating.

In FIGS. 5A and 5B, the tactile devices 18a and 18b may have different driving frequencies (and different vibrational frequencies). Due to the frequency difference (and the phase difference), the amplitude of vibrations transmitted from the tactile device 18a to the touch panel 17 may greatly differ from the amplitude of vibrations transmitted from the tactile device 18b to the touch panel 17 at a certain time.

The touch panel 17 including the vertical-vibration LRAs shown in FIG. 5A may largely vibrate vertically, possibly causing vibrations (and the tactile sensation) that vary largely depending on the touch position. In contrast, the touch panel 17 including the horizontal-vibration LRAs shown in FIG. 5B vibrates horizontally as a whole despite vibrations with different amplitudes transmitted from the tactile devices 18a and 18b, thus providing substantially uniform vibrations (and uniform tactile sensation) independently of the touch position.

The control method described with reference to FIGS. 1 and 2 eliminates the frequency difference (and the phase difference). Thus, this structure, including the tactile devices 18 being either vertical- or horizontal-vibration LRAs, can produce vibrations less dependent on the touch position. However, the control method eliminating the frequency difference can cause the slave device to have a smaller amplitude and cause an amplitude difference. The structure may include horizontal-vibration LRAs as the tactile devices 18, instead of vertical-vibration LRAs, to produce vibrations less dependent on the touch position under such an amplitude difference.

Details of Touch Panel System

Figure 6:
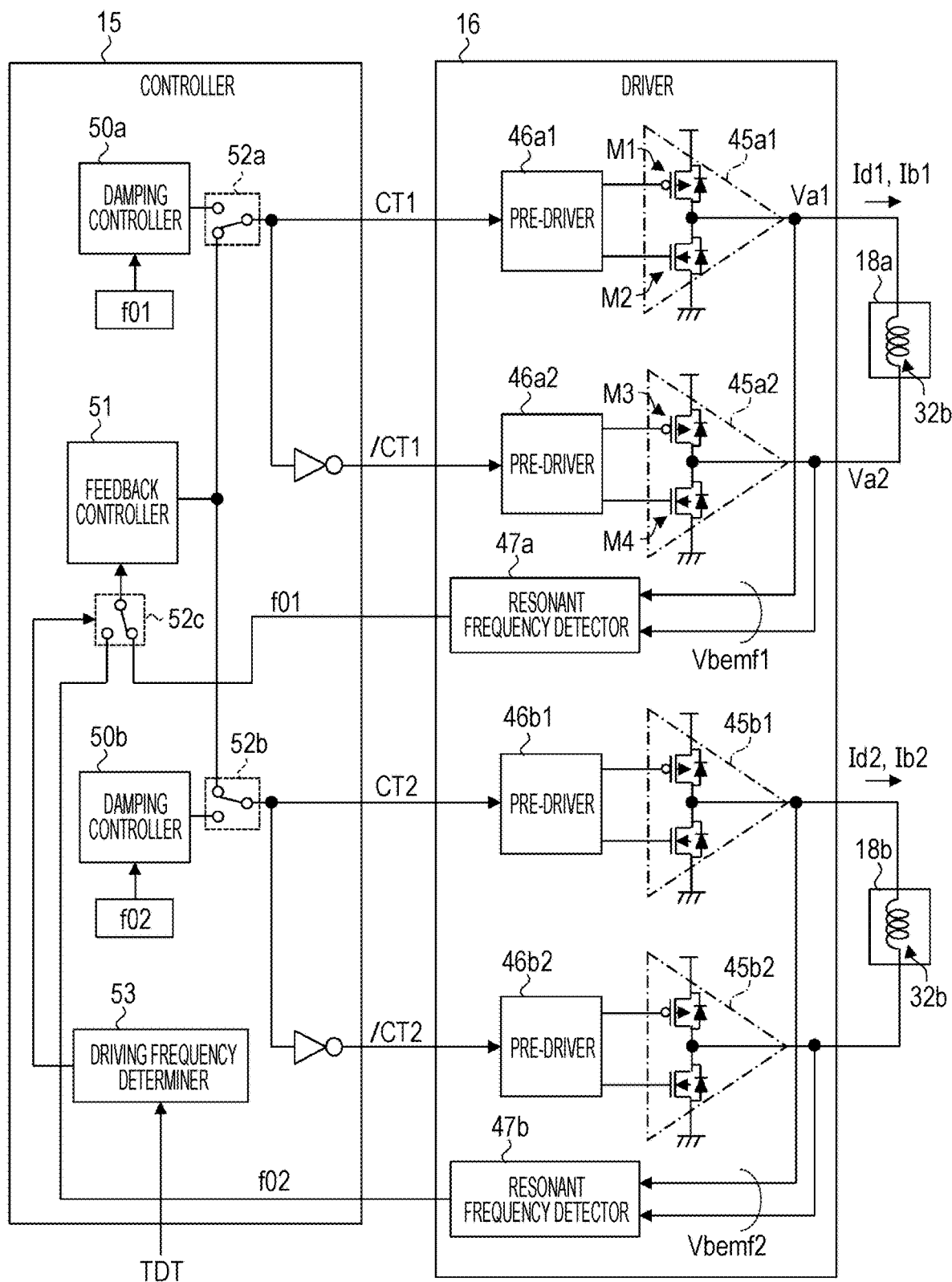
FIG. 6 is a block diagram of the touch panel system in FIG. 1 showing its detailed example structure.
Figure 7:
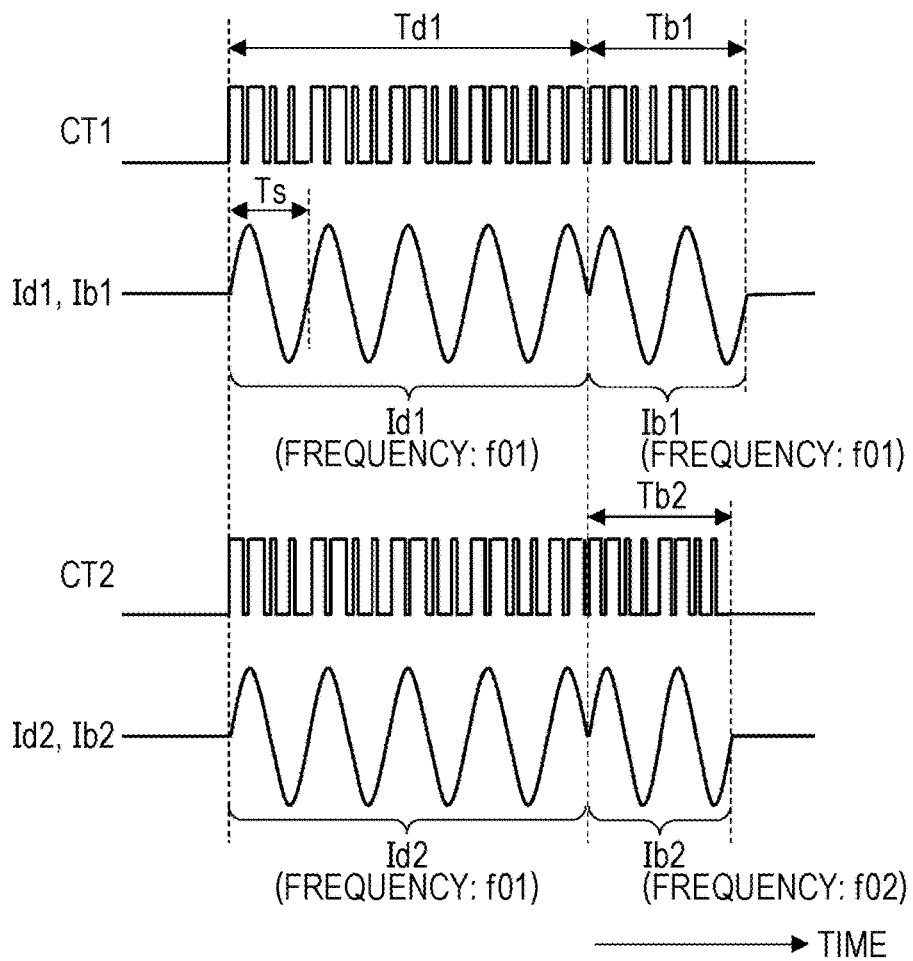
FIG. 7 is a waveform diagram describing schematic operation examples of the main components in FIG. 6.

FIG. 6 is a block diagram of the touch panel system in FIG. 1 showing its detailed example structure. FIG. 7 is a waveform diagram describing schematic operation examples of the main components in FIG. 6. In FIG. 6, the controller 15 includes damping controllers 50a and 50b, a feedback controller 51, selectors 52a, 52b, and 52c, and a driving frequency determiner 53. The feedback controller 51 outputs the identical control signals CT1 and CT2 for driving to the driver 16 (and to the tactile devices 18a and 18b) through the selectors 52a and 52b. The control signals CT1 and CT2 are, for example, pulse width modulation (PWM) signals as shown in FIG. 7.

The damping controller 50a prestores the resonant frequency f01 of the tactile device 18a. The damping controller 50a outputs the control signal CT1 for damping to the driver 16 (and to the tactile device 18a) through the selector 52a based on the resonant frequency f01. The damping controller 50b prestores the resonant frequency f02 of the tactile device 18b. The damping controller 50b outputs the control signal CT2 for damping to the driver 16 (and to the tactile device 18b) through the selector 52b based on the resonant frequency f02.

The driving frequency determiner 53 determines a master device in response to the touch detection signal TDT as described in, for example, steps S101 and S102 in FIG. 2. The selector 52c receives, from the driver 16 (described later), a feedback signal including information about the resonant frequency f01 or f02. The driving frequency determiner 53 controls the selector 52c to transmit, to the feedback controller 51, the feedback signal including information about the resonant frequency (f01 in this example) of the master device. The feedback controller 51 generates and outputs the identical control signals CT1 and CT2 for driving based on the feedback signal.

The driver 16 includes circuits corresponding to the tactile device 18a. The circuits include two drivers 45a1 and 45a2, two pre-drivers 46a1 and 46a2, and a resonant frequency detector 47a. The driver 16 also includes circuits corresponding to the tactile device 18b. The circuits include two drivers 45b1 and 45b2, two pre-drivers 46b1 and 46b2, and a resonant frequency detector 47b. The typical circuits for the tactile device 18a will now be described in detail, using the tactile device 18a as a master device.

The driver 45a1 is a half-bridge driver including two switching elements M1 and M2. The driver 45a2 is also a half-bridge driver including two switching elements M3 and M4. The driver 45a1 and the driver 45a2 are connected together with a coil 32a in the tactile device 18a to form an H-bridge circuit.

The pre-driver 46a1 switches the switching elements M1 and M2 based on the control signal CT1 from the controller 15. More specifically, the pre-driver 46a1 controls the switching element M1 to be on (or off) and the switching element M2 to be off (or on) in response to the control signal CT1 at a high (or low) level.

The pre-driver 46a2 switches the switching elements M3 and M4 based on an inverted control signal (/CT1) opposite in polarity to the control signal CT1. More specifically, the pre-driver 46a2 controls the switching element M3 to be on (or off) and the switching element M4 to be off (or on) in response to the inverted control signal (/CT1) at a high (or low) level. In other words, the pre-driver 46a2 controls the switching element M3 to be off (or on) and the switching element M4 to be on (or off) in response to the control signal CT1 at a high (or low) level.

For example, the controller 15 outputs the control signal (PWM signal) CT1 having the duty cycle sinusoidally modulated within a driving period Ts based on the driving frequency as shown in FIG. 7. In this case, the driver 45a1 has an output voltage Va1 that sinusoidally varies with PWM control over the switching elements M1 and M2. The driver 45a2 has an output voltage Va2 that varies in a manner opposite to the output voltage Va1 with PWM control over the switching elements M3 and M4. Thus, the coil 32a is driven using a sinusoidal driving signal, which is a driving voltage (Va1-Va2) and thus the driving current Id1, as shown in FIG. 7.

The resonant frequency detector 47a detects the resonant frequency f01 of the tactile device 18a. The tactile device 18a is a master device in the example of FIG. 6. In this case, the resonant frequency detector 47a detects the resonant frequency f01 of the master device. More specifically, the coil 32a receives a counter-electromotive voltage Vbemf1 that is zero every time when the vibrator (23 and 24) shown in, for example, FIG. 4C reaches the halfway point. The resonant frequency detector 47a detects the counter-electromotive voltage Vbemf1 and the interval between the zero points in the counter-electromotive voltage Vbemf1 to detect the resonant frequency f01 of the tactile device 18a.

As described above, the tactile device 18a may have, for example, variations of about several percent in the resonant frequency f01 caused by manufacturing variations, environmental factors (e.g., temperature), and changes over time. Despite such variations, the resonant frequency detector 47a can accurately detect the resonant frequency f01 of the tactile device 18a. The feedback controller 51 updates the driving period Ts in FIG. 7 using the resonant frequency f01 detected by the resonant frequency detector 47a as a target driving frequency. The feedback controller 51 then generates and outputs the control signal CT1 based on the updated driving period Ts.

FIG. 7 shows an example operation in a predetermined period (driving period Td1) associated with step S103 in FIG. 2, and an example operation in damping periods Tb1 and Tb2 associated with step S104 in FIG. 2. The control state in the drive period Td1 is the state shown in FIG. 6. More specifically, the feedback controller 51 receives the feedback signal (f01) from the resonant frequency detector 47a and outputs the identical control signals CT1 and CT2 through the selectors 52a and 52b.

In this case, the master device (18a) is driven using the master driving signal (Id1) generated through closed-loop control (feedback control) using the resonant frequency (f01) of the master device detected by the resonant frequency detector 47a as a target driving frequency. The slave device (18b) is driven through open-loop control using the slave driving signal (Id2) generated based on the resonant frequency (f01) of the master device (18a). More specifically, the slave device (18b) is controlled through open-loop control without transmission of the feedback signal from the resonant frequency detector 47b to the feedback controller 51.

In the damping period Tb1 in FIG. 7, the master device (18a) is driven using the master damping signal (Ib1) generated through open-loop control performed by the damping controller 50a in FIG. 6. In this period, the selector 52a is switched from the feedback controller 51 to the damping controller 50a. In the damping period Tb2 in FIG. 7, the slave device (18b) is driven using the slave damping signal (Ib2) generated through open-loop control performed by the damping controller 50b in FIG. 6. In this period, the selector 52b is switched from the feedback controller 51 to the damping controller 50b.

When, for example, the touch panel system 10 is activated, the damping controller 50a may maintain the resonant frequency f01 detected by the resonant frequency detector 47a under closed-loop control. Similarly, when the touch panel system 10 is activated, the damping controller 50b may maintain the resonant frequency f02 detected by the resonant frequency detector 47b under closed-loop control (or in other words, with the selector 52c in FIG. 6 being switched). In this period, the resonant frequency detector 47b detects the resonant frequency f02 based on a counter-electromotive voltage Vbemf2 across a coil 32b in the tactile device 18b, similarly to the resonant frequency detector 47a.

The controller 15 and the driver 16 are not limited to the implementation shown in FIG. 6 but may be modified variously to set the driving signals (Id1 and Id2) and the damping signals (Ib1 and Ib2) as described in FIG. 7. For example, a known driver IC performs the closed-loop control described in FIG. 6 with a driver 16 alone in response to a driving starting instruction from a controller. Other known driver ICs include a driver IC switchable between closed-loop control and open-loop control, and a driver IC that automatically damps vibrations in response to a damping starting instruction from a controller. One or more of such driver ICs may be implemented to switch the driving frequency (damping frequency) as appropriate to achieve control similar to the control described in FIG. 6.

OTHER MODIFICATIONS

Figure 8:
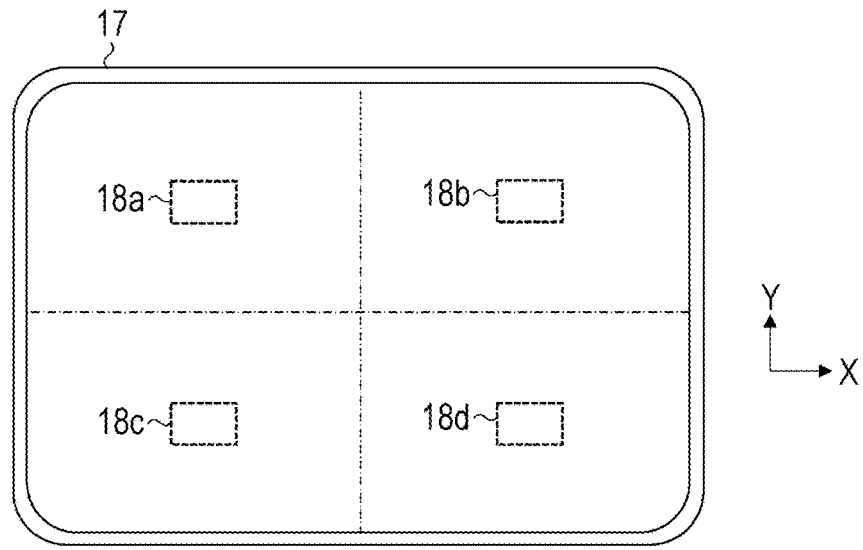
FIG. 8 is a diagram of the touch panel and its associated devices in FIG. 1 in a modification.

FIG. 8 is a diagram of the touch panel and its associated devices in FIG. 1 in a modification. FIG. 8 shows a touch panel 17 including four tactile devices 18a to 18d, unlike the structure shown FIG. 1. The four tactile devices 18a to 18d are evenly spaced from one another on the surface of the touch panel 17 to minimize the distance between the touch position and the attachment position of a master device.

When, for example, the tactile device 18 closest to the touch position is the tactile device 18a, the master device is determined to be the tactile device 18a. The other three tactile devices 18b to 18d may all be driven as slave devices, or at least one of the three tactile devices may be driven as a slave device. For example, the tactile device 18d may be stopped and the tactile devices 18b and 18c may be driven as slave devices at the resonant frequency of the master device. In this case, the vibrations of the two tactile devices 18b and 18c operable as slave devices may be damped at their resonant frequencies.

ADVANTAGES OF EMBODIMENTS

The method in the embodiments typically improves the user's tactile sensation. In particular, the method can improve the user's tactile sensation on larger and heavier touch panels.

The present invention is not limited to the above embodiments, but may be modified variously without departing from the spirit and scope of the invention.

What is claimed is:

1. A vibration actuator for a touch panel, the vibration actuator comprising:
   a plurality of tactile devices attachable at different positions on a surface of the touch panel to vibrate the touch panel; and
   a driver configured to drive, in response to a touch detection signal representing a touch position from the touch panel, the plurality of tactile devices each using a driving signal having a predetermined driving frequency,
   wherein of the plurality of tactile devices, a tactile device closest to the touch position is operable as a master device, and a tactile device other than the master device is operable as a slave device, and
   the master device and the slave device are driven using the driving signal having the driving frequency being a resonant frequency of the master device.

2. The vibration actuator according to claim 1, wherein the plurality of tactile devices vibrate in the same direction along the surface of the touch panel.

3. The vibration actuator according to claim 1, wherein the driver includes a resonant frequency detector configured to detect the resonant frequency of the master device,
   the master device is driven using a master driving signal generated through closed-loop control using the resonant frequency of the master device detected by the resonant frequency detector as a target driving frequency, and
   the slave device is driven through open-loop control using a slave driving signal generated based on the resonant frequency of the master device.

4. The vibration actuator according to claim 1, wherein after the master device is driven using the driving signal, vibrations of the master device are damped using a master damping signal, and the master damping signal is opposite in polarity to the driving signal and varies at the resonant frequency of the master device, and
   after the slave device is driven using the driving signal, vibrations of the slave device are damped using a slave damping signal, and the slave damping signal is opposite in polarity to the driving signal and varies at a resonant frequency of the slave device.

5. The vibration actuator according to claim 1, wherein the plurality of tactile devices are evenly spaced from one another on the surface of the touch panel.

6. The vibration actuator according to claim 1, wherein the slave device is configured to receive a different control signal from the master device.

7. The vibration actuator according to claim 1, wherein the resonant frequency is different from a master driving frequency of the master device.

8. A method for driving a vibration actuator for a touch panel, the vibration actuator including a plurality of tactile devices attachable at different positions on a surface of the touch panel to vibrate the touch panel, the method comprising:
   determining, of the plurality of tactile devices, a tactile device closest to a touch position to be a master device in response to a touch detection signal representing the touch position from the touch panel; and
   driving the master device and a slave device, wherein the slave device is a tactile device other than the master device of the plurality of tactile devices, and the driving comprises driving the slave device using a driving signal to drive the slave device at a resonant frequency of driving of the master device.

9. The method according to claim 8, wherein the plurality of tactile devices vibrate in the same direction along the surface of the touch panel.

10. The method according to claim 8, wherein driving the master device and the slave device includes driving the master device using a master driving signal generated through closed-loop control using the resonant frequency of the master device as a target driving frequency, and driving the slave device through open-loop control using a slave driving signal generated based on the resonant frequency of the master device.

11. The method according to claim 8, further comprising: after driving the master device and the slave device, damping vibrations of the master device using a master damping signal and damping vibrations of the slave device using a slave damping signal, the master damping signal being opposite in polarity to the driving signal and varying at the resonant frequency of the master device, the slave damping signal being opposite in polarity to the driving signal and varying at a resonant frequency of the slave device.

12. The method according to claim 8, wherein the driving comprises:
   driving the slave device using the driving signal; and
   driving the master device using a master driving signal different from the driving signal.

13. The method according to claim 8, wherein the driving comprises:
   driving the slave device at the resonant frequency; and
   driving the master device at a frequency different from the resonant frequency.

* * * * *